United States Patent
Maggiore et al.

(10) Patent No.: US 11,021,136 B1
(45) Date of Patent: Jun. 1, 2021

(54) METHODS AND SYSTEMS FOR PROVIDING A REMOTE VIRTUAL VIEW

(75) Inventors: Jeanne C. Maggiore, Wildwood, MO (US); Kevin L. Swearingen, St. Charles, MO (US)

(73) Assignee: THE BOEING COMPANY, Chicago, IL (US)

( * ) Notice: Subject to any disclaimer, the term of this patent is extended or adjusted under 35 U.S.C. 154(b) by 612 days.

(21) Appl. No.: 13/219,967

(22) Filed: Aug. 29, 2011

(51) Int. Cl.
*B60R 1/00* (2006.01)
*H04N 7/18* (2006.01)
*B60R 25/30* (2013.01)
*H04N 5/225* (2006.01)

(52) U.S. Cl.
CPC .............. *B60R 25/305* (2013.01); *B60R 1/00* (2013.01); *H04N 5/2251* (2013.01); *H04N 7/181* (2013.01); *B60R 2300/30* (2013.01)

(58) Field of Classification Search
CPC ........ G07C 9/00158; G08B 1/08; B60R 1/00; B60R 2300/105; B60R 2300/205; B60R 2300/207; B60R 2300/302; B60R 2300/802; B60R 2300/806; B60R 2300/70; B60R 11/04; B60R 2300/30; B60R 2300/306; B60R 2300/50; B60R 2300/602; B60R 2300/80; B60R 2300/8066; B60R 25/305; H04N 5/23238; H04N 5/23293; H04N 19/172; H04N 5/2254; H04N 5/23296; H04N 19/136; H04N 19/176; H04N 5/2252; H04N 7/181; H04N 7/18; H04N 5/2253; H04N 5/2257; H04N 5/2621; H04N 5/2624; H04N 5/247; H04N 5/374; H04N 5/2251; H04N 21/4223; H04N 7/188; G06F 3/013; G06F 3/04842; G06F 3/1203; G06F 3/1211; G06F 3/14; G06F 17/30011; G06F 17/30241; B64F 5/00; G01B 11/03; G01B 21/04; G01S 7/20; G01S 13/68; G01S 17/89; G01S 19/26
See application file for complete search history.

(56) References Cited

U.S. PATENT DOCUMENTS

| | | | | |
|---|---|---|---|---|
| 4,380,024 A | * | 4/1983 | Olofsson | G02B 27/01 348/115 |
| 4,639,106 A | * | 1/1987 | Gradin | G03B 21/00 348/E5.143 |
| 5,123,728 A | * | 6/1992 | Gradin | B64D 11/0015 348/61 |
| 5,440,337 A | * | 8/1995 | Henderson | B64D 11/0015 348/144 |
| 6,405,975 B1 | * | 6/2002 | Sankrithi | B64D 47/08 244/1 R |
| 6,866,225 B2 | | 3/2005 | Jones et al. | |
| 7,046,259 B2 | | 5/2006 | Humphries | |
| 7,070,150 B2 | | 7/2006 | Jones et al. | |

(Continued)

*Primary Examiner* — Tsion B Owens
(74) *Attorney, Agent, or Firm* — Armstrong Teasdale LLP

(57) ABSTRACT

Methods and systems for providing remote virtual views to an occupant of a structure are disclosed. In one example, a method includes capturing, by a plurality of cameras, images external to a structure. A distribution device receives images from the plurality of cameras. The distribution device selectively transmits the images to at least one display device within the structure. The at least on display device receives the images and displays the images on an interior surface of the structure.

25 Claims, 6 Drawing Sheets

(56) References Cited

U.S. PATENT DOCUMENTS

| | | | |
|---|---|---|---|
| 7,088,310 B2* | 8/2006 | Sanford | A61M 21/02 345/7 |
| 7,148,909 B2* | 12/2006 | Yui | G06F 3/14 345/660 |
| 7,151,469 B2* | 12/2006 | Gomez | B64D 45/0015 340/945 |
| 7,226,173 B2* | 6/2007 | Aoyanagi | G03B 5/02 353/101 |
| 7,280,134 B1 | 10/2007 | Henderson | B64D 11/0015 348/117 |
| 7,312,725 B2 | 12/2007 | Berson et al. | |
| 7,486,291 B2 | 2/2009 | Berson et al. | |
| 7,564,468 B2 | 7/2009 | Sanford | |
| 7,570,274 B2* | 8/2009 | Humphries | A61M 21/02 340/988 |
| 7,800,628 B2* | 9/2010 | Harville | G06F 3/1446 345/589 |
| 7,843,362 B2* | 11/2010 | Augst | B62D 15/0285 340/435 |
| 7,982,767 B2 | 7/2011 | Berson et al. | |
| 8,277,053 B2* | 10/2012 | Vogel | B64D 11/0015 345/647 |
| 8,446,468 B1* | 5/2013 | Medion et al. | 348/144 |
| 8,675,068 B2* | 3/2014 | Nixon | 348/144 |
| 8,675,069 B2* | 3/2014 | Ohshima | B60R 1/00 348/118 |
| 8,878,941 B2* | 11/2014 | Anway | H04N 17/004 348/180 |
| 9,304,305 B1* | 4/2016 | Paul | G02B 13/12 |
| 9,558,715 B2* | 1/2017 | Velten | G06F 3/0412 |
| 2002/0015003 A1* | 2/2002 | Kato et al. | 345/1.1 |
| 2002/0175924 A1* | 11/2002 | Yui | G06F 3/14 345/660 |
| 2003/0067411 A1* | 4/2003 | Paschen | H01Q 1/286 343/700 MS |
| 2003/0152145 A1* | 8/2003 | Kawakita | H04N 5/77 375/240.12 |
| 2003/0162312 A1* | 8/2003 | Takayama | H01L 21/76251 438/22 |
| 2004/0217978 A1* | 11/2004 | Humphries | A61M 21/02 345/649 |
| 2005/0031314 A1* | 2/2005 | Galdos | H04N 5/765 386/223 |
| 2005/0114901 A1* | 5/2005 | Yui | H04N 7/163 725/100 |
| 2005/0179875 A1* | 8/2005 | Aoyanagi | G03B 5/02 353/101 |
| 2006/0232497 A1* | 10/2006 | Sanford | A61M 21/02 345/5 |
| 2006/0232609 A1* | 10/2006 | Humphries | A61M 21/02 345/659 |
| 2006/0238375 A1* | 10/2006 | Gomez | B64D 45/0015 340/945 |
| 2006/0244817 A1* | 11/2006 | Harville | H04N 7/15 348/14.08 |
| 2007/0291047 A1* | 12/2007 | Harville | G06F 3/1446 345/589 |
| 2007/0291189 A1* | 12/2007 | Harville | G06F 3/1423 349/7 |
| 2008/0129544 A1* | 6/2008 | Augst | B62D 15/027 340/932.2 |
| 2008/0158352 A1* | 7/2008 | Schmidt | B60R 1/00 348/118 |
| 2008/0158510 A1* | 7/2008 | Tant et al. | 353/14 |
| 2008/0206720 A1* | 8/2008 | Nelson | G09B 9/165 434/44 |
| 2009/0094635 A1* | 4/2009 | Aslin | H04H 20/62 725/32 |
| 2009/0195652 A1 | 8/2009 | Gal | |
| 2009/0256909 A1* | 10/2009 | Nixon | B64D 47/08 348/144 |
| 2009/0316001 A1* | 12/2009 | Anway | H04N 7/183 348/181 |
| 2010/0066833 A1* | 3/2010 | Ohshima | B60R 1/00 348/148 |
| 2010/0214496 A1* | 8/2010 | Vogel | B64D 11/0015 348/744 |
| 2011/0115990 A1* | 5/2011 | Bhaktiar | B60R 11/0235 348/794 |
| 2011/0134209 A1* | 6/2011 | Schmidt | H04N 7/002 348/38 |
| 2011/0170023 A1* | 7/2011 | Ishida | 348/837 |
| 2011/0175752 A1* | 7/2011 | Augst | B60R 1/00 340/905 |
| 2011/0242317 A1* | 10/2011 | Wengrovitz | H04N 7/181 348/143 |
| 2012/0026333 A1* | 2/2012 | Okuyama | G06T 5/009 348/148 |
| 2012/0224058 A1* | 9/2012 | Benning | B64D 47/08 348/144 |
| 2012/0229596 A1* | 9/2012 | Rose | G06T 3/4038 348/36 |
| 2012/0249789 A1* | 10/2012 | Satoh | G06K 9/00805 348/143 |
| 2012/0292986 A1* | 11/2012 | Riedel | B64D 11/00 307/9.1 |
| 2014/0085337 A1* | 3/2014 | Velten | G06F 3/017 345/635 |

* cited by examiner

METHODS AND SYSTEMS FOR PROVIDING A REMOTE VIRTUAL VIEW

BACKGROUND

The field of the disclosure relates generally to visual display systems, and more specifically to methods and systems for providing a remote virtual view.

Structures, such as vehicles, buildings, aircraft, and space stations, often include windows or other openings that provide an occupant of the structure, among other things, a view outside of the structure. Generally, however, windows are a structural weakness in a structure and may increase cost to designs and construct a structure. Furthermore, the view from a window is typically limited by its physical location within structure. The view from a window may also be limited by environmental factors, such as the location of the structure, the weather, the time of day, environmental factors external to the structure. Often, a structure includes one or more areas in which a window is impractical or impossible, such as an interior room in a building. Moreover, the absence and/or small size of windows in a structure may tend to make a structure feel small and/or confining to an occupant of the structure.

BRIEF DESCRIPTION

According to one aspect of the present disclosure, system for use in providing a remote virtual view to an occupant of a structure includes a plurality of cameras for positioning relative to a structure to capture images external to the structure. The system includes a display device configured to display images within an interior of the structure, and a distribution device coupled to the plurality of cameras and the display device. The distribution device is configured to selectively transmit the captured images to the display device.

In another aspect, a system for use in providing a remote virtual view to an occupant of a structure includes a remote virtual view system coupled to the structure and a controller to enable at least partial control of said remote virtual view system. The system includes a plurality of cameras mounted to the structure, a plurality of display devices, and a distribution device coupled to the plurality of cameras and the plurality of display devices. The plurality of cameras are positioned to capture exterior images from the structure. The plurality of display devices are configured to display images on an interior surface of the structure. The distribution device is configured to selectively transmit the captured exterior images to one or more of the plurality of display devices.

In yet another aspect, a method of providing a remote virtual view to an occupant of a structure includes capturing, by a plurality of cameras, images external to a structure. A distribution device receives images from the plurality of cameras. The distribution device selectively transmits the images to at least one display device within the structure. The at least on display device receives the images and displays the images on an interior surface of the structure.

The features, functions, and advantages that have been discussed can be achieved independently in various embodiments or may be combined in yet other embodiments further details of which can be seen with reference to the following description and drawings.

DETAILED DESCRIPTION

As used herein, an element or step recited in the singular and proceeded with the word "a" or "an" should be understood as not excluding plural elements or steps unless such exclusion is explicitly recited. Furthermore, references to "one embodiment" of the present invention or the "exemplary embodiment" are not intended to be interpreted as excluding the existence of additional embodiments that also incorporate the recited features.

Exemplary methods and systems for providing remote virtual views are described herein. The methods and systems described herein may permit structures to be constructed with fewer, or no, windows or openings while still providing an occupant of the structure with the appearance of a view of outside the structure. Accordingly, structural integrity may be improved over some known constructions and/or costs of construction may be reduced. Moreover, the methods and systems described herein may permit an administrator to control the images displayed to an occupant of the structure and to convey appropriate information to the occupant when desired. Furthermore, an administrator can simulate diurnal cycles by displaying appropriate images using the methods and systems described herein. Further, the methods and systems described herein may permit multiple occupants of a structure to receive the same remote virtual view regardless of the occupants' locations within the structure.

Figure 1:
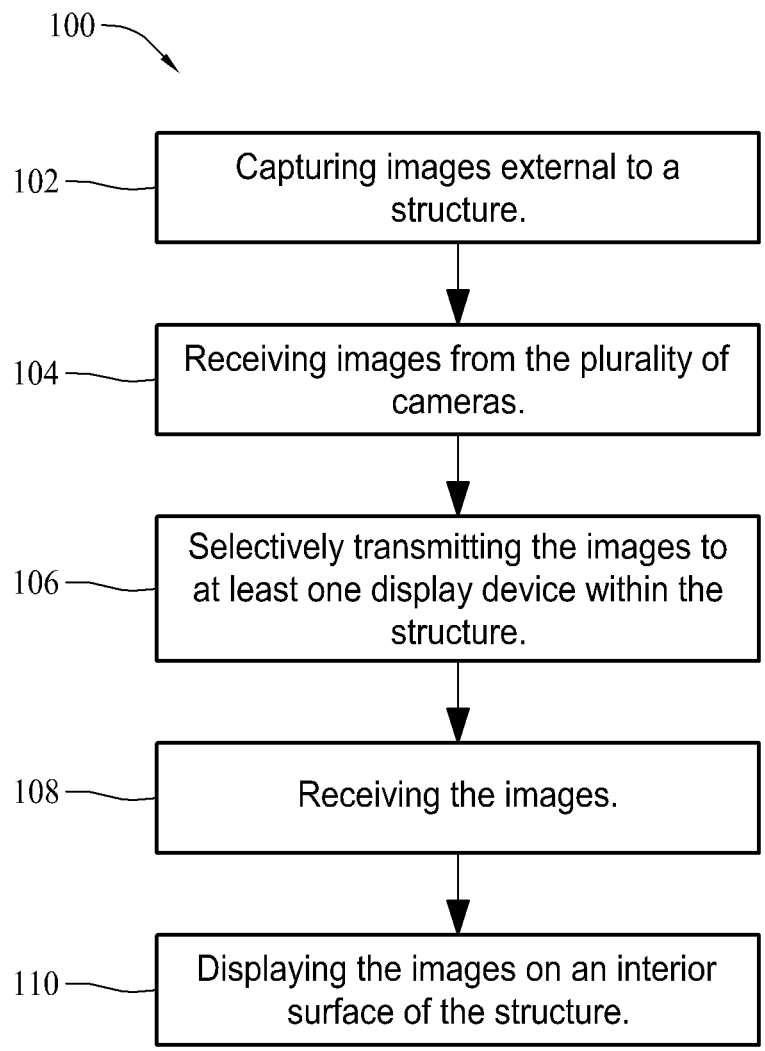
FIG. 1 is a flow diagram of an exemplary method that may be implemented to provide a remote virtual view to an occupant of a structure.

Referring to the drawings, FIG. 1 is a flow diagram of an exemplary method, generally indicated by reference number 100, of providing a remote virtual view to an occupant of a structure. Initially, in the exemplary embodiment, a plurality of imaging devices (not shown in FIG. 1) capture 102 images external to a structure (not shown in FIG. 1). A distribution device (not shown in FIG. 1) receives 104 images from the plurality of imaging devices and selectively transmits 106 the images to at least one display device (not shown in FIG. 1) within the structure. The display device receives 108 the transmitted images and each selected display device displays 110 the received images on an interior surface of the structure.

Figure 2:
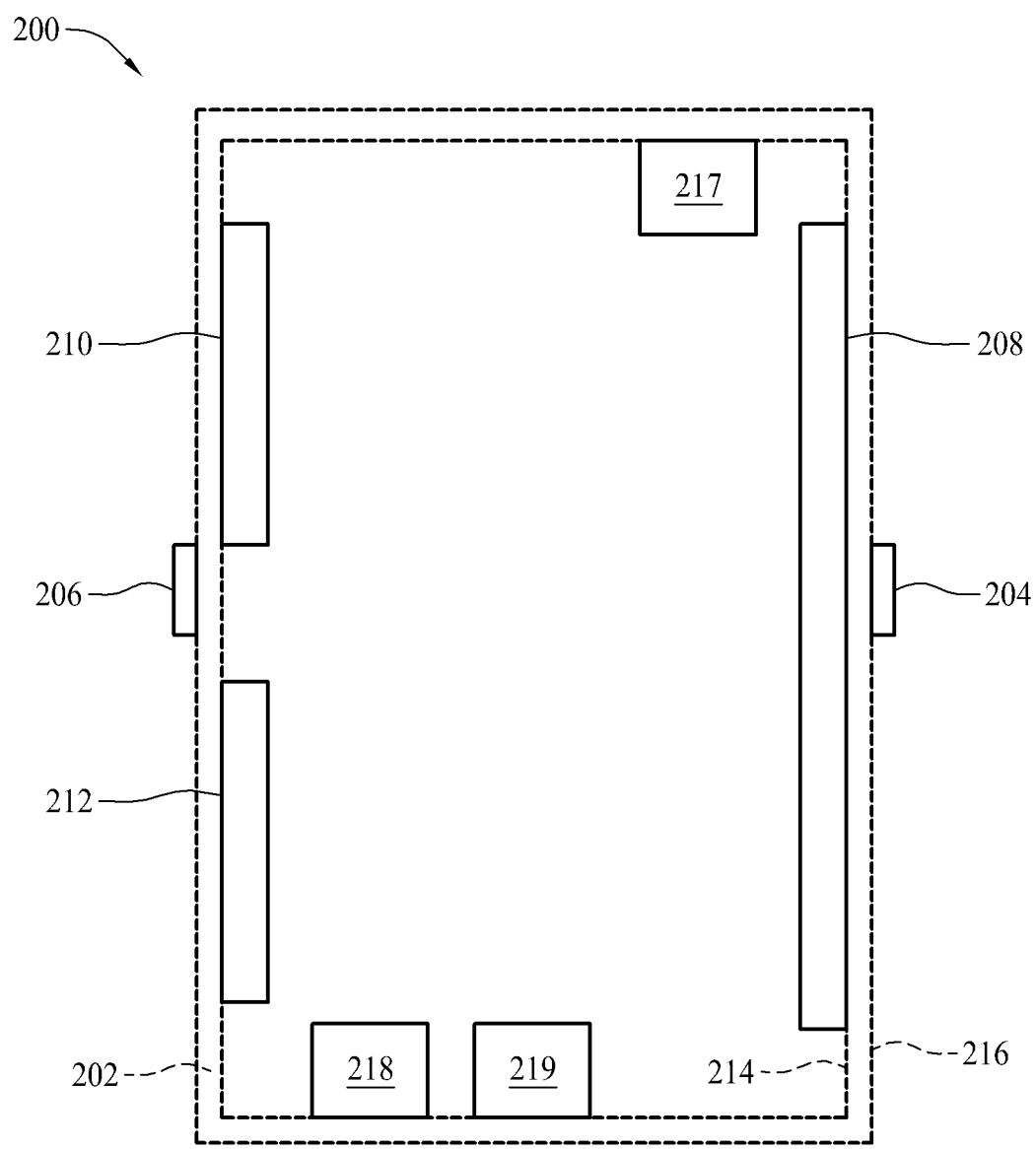
FIG. 2 is a block diagram of an exemplary system for use in providing a remote virtual view.

FIG. 2 is a block diagram of an exemplary system 200 that may be used to perform method 100 (shown in FIG. 1). In the exemplary embodiment, system 200 is mounted to a structure 202 defining an interior and an exterior. More specifically, in the exemplary embodiment, system 200 includes two imaging devices 204 and 206 that are positioned to capture images exterior to structure 202. Three display devices 208, 210, and 212 are mounted to interior surfaces 214 of structure 202. A distribution device 218 is communicatively coupled to imaging devices 204 and 206, to display devices 208, 210, and 212, to a user control module 217, and to an administrator controller 219.

Structure 202 may be any suitable structure that includes an interior and an exterior. For example, in some embodiments, structure 202 is an aircraft. In other embodiments, the structure 202 is a moveable vehicle, such as a car, a van, a bus, a subway car, etc. In yet other embodiments, structure 202 is fixed in location, such as a building. In still other embodiments, the structure may be a spacecraft, a space station, a satellite, etc.

Imaging devices 204 and 206 capture images external to structure 202. Imaging devices 204 and 206 may be any imaging device that is suitable for use in capturing still images and/or video. As used herein, an image includes a still image, a succession of still images, and/or moving images, also referred to as video. Moreover, in some embodiments imaging devices 204 and 206 are cameras, such as digital cameras. Imaging devices 204 and 206 may include any sensor that senses wavelengths ranging within the visible spectrum. In some embodiments, imaging devices 204 and 206 include, for example, complimentary metal-oxide-semiconductor (CMOS) imaging devices and/or charge-coupled device (CCD) imaging devices. In still other embodiment, imaging devices 204 and 206 may be optical devices that sense different wavelengths including, for example, infrared wavelengths, ultraviolet wavelengths, etc. In some embodiments, imaging devices 204 and 206 have a wide viewing angle.

Imaging devices 204 and 206 are positioned to capture images of scenes that are external to structure 202. For example, in the exemplary embodiment, imaging devices 204 and 206 are mounted to exterior surface 216 of structure 202. In other embodiments, imaging devices may be mounted in any other location that enables images external to structure 202 to be captured. For example, imaging devices 204 and 206 may be mounted in the interior of structure 202 and aimed through a window or opening, and/or may be mounted in a recess defined between interior surface 214 and exterior surface 216.

The subject of the images may vary based on the type of structure 202. For example, if structure 202 is a vehicle, imaging devices 204 and 206 may capture 102 images of the surroundings/environment through which the vehicle is traveling. If structure 202 located in a fixed location, such as a building, the subject of the images will generally remain the same, but the details may vary. For example the time of day, the weather, local flora and fauna, and/or the cleanliness of the surroundings may vary.

In the exemplary embodiment, distribution device 218 receives images from imaging devices 204 and/or 206 and selectively transmits the captured images to at least one display device 208, 210, and/or 212 within structure 202. The images to be transmitted to a particular display device 208, 210, or 212 may be selected via distribution device 218. For example, a person who will be viewing the images transmitted to a particular display device 208, 210, or 212 may select, via user control module 217, which images distribution device 218 will transmit for display on the display device 208, 210, and/or 212. Additionally, or alternatively, another person, such as a system administrator, may select, via administrator controller 219, which images will be displayed on which imaging device 208, 210, and/or 212. Further, distribution device 218 may, additionally or alternatively, be programmed to select which images are transmitted to which display device 208, 210, and/or 212. Distribution device 218 may selectively transmit the same images to more than one display device 208, 210, and/or 212, transmit different images to each display device 208, 210, and/or 212, and/or transmit the same image to more than one, but not all, display devices 208, 210, and/or 212.

Distribution device 218 may be configured to selectively transmit a portion of an image to display device 208, 210, and/or 212 that is not the complete image received from an imaging device 204 and/or 206. In the exemplary embodiment, for example, distribution device 218 is configured to divide images received from imaging device 206 into two such images that may each be transmitted to different display devices 210 and 212. The portion of the image transmitted to each display device 210 and 212 may correspond to a view from the exterior of structure 202 at the location of that particular display device 210 and 212. In some embodiments distribution device 218 may merge, or stitch, images from more than one imaging device 204 and 206. For example, multiple images from multiple imaging devices 204 and 206 may be merged together into a single image, such as a panoramic image.

Distribution device 218, in some embodiments, selectively transmits images not received from imaging devices 204 and/or 206 to one or more display devices 208, 210, and/or 212. Thus, in some embodiments, a prerecorded image may be selectively transmitted to one or more display device 208, 210, and/or 212. The prerecorded images may include, but are not limited to only including, recorded images from one of imaging devices 204 and/or 206, recorded images from any other imaging device, recorded instructional videos, recorded movies or television programs, recorded safety instructions, and/or recorded warnings, for example.

In some embodiments, distribution device 218 may selectively alter one or more images before transmitting the altered images to display device 208, 210, and/or 212. For example, distribution device 218 may correct the color, the brightness, the contrast, and/or any other defects in an image. In some embodiments, distribution device 218 may alter an image to provide a more realistic image for display by display device 208, 210, and/or 212. For example, distribution device 218 may alter an image to correct for a non-planar display. If a standard image is displayed on a non-planar surface, the image may appear distorted. Accordingly, distribution device 218 may alter the image to reduce an amount of distortion that may appear when displayed on a non-planar surface.

Selection of which images to display on display devices 208, 210, and/or 212 may be made by a user via user control module 217 coupled to distribution device 218. A user may, for example, select to display an image from imaging device 204 or from imaging device 206 on display device 208. Alternatively, a user may select to display a prerecorded image from one imaging device 204 or 206 on display device 208. In some embodiments, the user may also select to display television programs (live or recorded), movies, or other selectable images on display device 206 and/or 208. In the absence of a user selection, in some embodiments distribution device will transmit images from imaging device 204 to display device 208 and images from imaging device 206 to display devices 210 and 212. In some embodiments, user selection via user control module 217 may be disabled or overridden, such as by an administrator. Moreover, in some embodiments a user can control playback of images on one or more display devices 208, 210, and/or 212. For example, in some embodiments the user can pause, rewind, and fast forward the images.

Selection of which images to display on display devices 208, 210, and/or 212 may be made via administrator controller 219 coupled to distribution device 218. An administrator may, for example, set default selections to be used in the absence of a user selection. In some embodiments, the administrator may, via administrator controller 219, override a user selection or prevent any user selections. In the exemplary embodiment, administrator controller 219 is a computing device with a processor, a memory device, a user interface, and a display adapter. In the exemplary embodiment, the user interface includes a keyboard that enables the user to input pertinent information. Alternatively, the user interface may include, for example, a pointing device, a mouse, a stylus, a touch sensitive panel (e.g., a touch pad or a touch screen), a gyroscope, an accelerometer, a position detector, and/or an audio input interface (e.g., including a microphone). The presentation interface includes a display adapter and a display device that presents information, such as input events and/or validation results, to the administrator. In some embodiments, the user interface may be integrated with the display device in a touch screen display. Moreover, in the exemplary embodiment, the processor is programmed by encoding an operation using one or more executable instructions and providing the executable instructions in memory device.

Display devices 208, 210, and 212 receive transmitted images and display the received images on structure interior surface 214. In the exemplary embodiment, at least one display device 208, 210, and/or 212 is mounted on interior surface 214 and the received images are displayed on interior surface 214 by display on display device 208, 210, and 212 themselves. In the exemplary embodiment, display devices 208, 210, and/or 212 may be any suitable device for displaying images including, for example, a cathode ray tube (CRT) monitor, a light emitting diode (LED) monitor, a liquid crystal display (LCD) monitor, a plasma monitor, an organic light emitting diode (OLED) monitor, an electronic ink display, etc. In other embodiments, display devices 208, 210, and/or 212, whether mounted to interior surface 214, or any other location, display the received images directly on structure interior surface 214. For example, in some embodiments, at least one display device 208, 210, and/or 212 is a projector positioned to project the received image onto interior surface 214. The projector may be mounted on interior surface 214, or may be mounted at a different location. For example, if interior surface 214 is a wall, the projector may be mounted on the wall, on a floor, on a ceiling, on a piece of furniture, etc. In such an embodiment, at least one display device 208, 210, and/or 212 displays received images on a wall of structure 202. In other embodiments, display devices 208, 210, and/or 212, additionally or alternatively, display received images on a floor and/or ceiling of structure 202.

In some embodiments, display devices 208, 210, and/or 212 may be configured to alter one or more images before displaying the images. For example, display devices 208, 210, and/or 212 may correct the color, the brightness, and/or the contrast of the images. In some embodiments, display devices 208, 210, and/or 212 may alter an image to provide a more realistic display of the image on interior surface 214. For example, if interior surface 214 is non planar, e.g., concave, convex, etc., display device 208, 210, and/or 212 may alter an image to reduce an amount of distortion that may appear when the image is displayed on a non-planar surface. Such alterations may be accomplished via hardware and/or software manipulation of the images. For example, display device 208, 210, and/or 212 may include a computing device programmed by software to make such alterations, and/or may include one or more lenses configured to alter the images.

Figure 3:
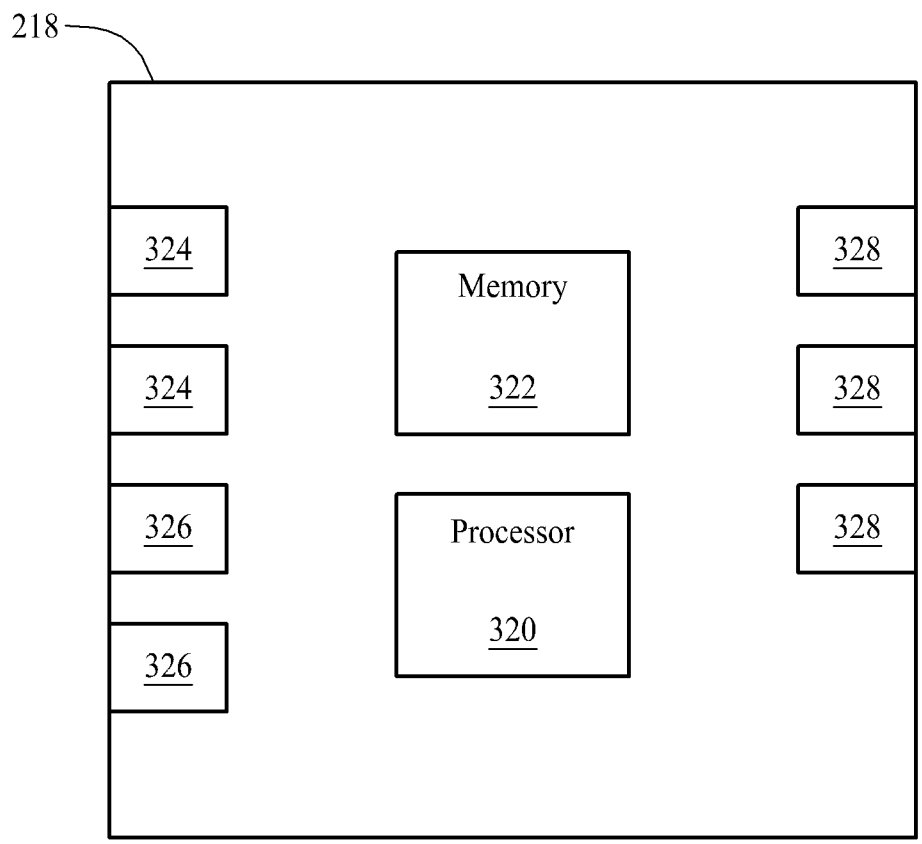
FIG. 3 is a block diagram of an exemplary distribution device for use with the system shown in FIG. 2.

FIG. 3 is a block diagram of an exemplary distribution device, such as distribution device 218. In this embodiment, distribution device 218 includes a processor 320, a memory device 322, inputs 324 and 326, and outputs 328.

Inputs 324 couple distribution device 218 to imaging devices, such as imaging devices 204 and/or 206. Inputs 324 may be communicatively coupled to imaging devices 204 and/or 206 directly or via one or more intermediary devices. For example, inputs 324 may be coupled to imaging devices 204 and 206 directly via wires or cables, via the Internet, via wireless communication, or via any other network. Alternatively, or additionally, inputs 324 may be coupled to imaging devices 204 and/or 206 via an intermediary, such as a repeater, a server, a router, etc. (not shown). Although the embodiment shown in FIG. 3 includes two inputs 324, distribution device 218 may include any suitable number of inputs 324.

Distribution device 218 is coupled to one or more display devices, such as display devices 208, 210, and/or 212, via outputs 328. Outputs 328 may be communicatively coupled to display devices 208, 210, and/or 212 directly or via one or more intermediary devices. For example, outputs 328 may be coupled to display devices 208, 210, and/or 212 directly via wires or cables, via the Internet, via wireless communication, or via any other network. Alternatively, or additionally, outputs 328 may be coupled to display devices 208, 210, and/or 212 via an intermediary, such as a repeater, a server, a router, etc. (not shown). Although the embodiment shown in FIG. 3 includes three outputs 328, distribution device 218 may include any suitable number of outputs 328.

Inputs 326 are used to couple distribution device 218 to a user control module, such as user control module 217, and/or an administrator controller, such as administrator controller 219. Inputs 326 may be communicatively coupled to user control module 217 and administrator controller 219 directly or via one or more intermediary devices. Although the embodiment shown in FIG. 3 includes two inputs 326, distribution device 218 may include any suitable number of inputs 326.

In the exemplary embodiment, processor 320 is programmed by encoding an operation using one or more executable instructions and providing the executable instructions in memory device 322. As used herein, the term "processor" refers generally to any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term "processor."

In the exemplary embodiment, memory device 322 includes one or more devices that enable information, such as executable instructions and/or other data, to be stored and retrieved. As used herein, a memory device includes one or more non-transitory computer readable media, such as, without limitation, dynamic random access memory (DRAM), static random access memory (SRAM), a solid state disk, and/or a hard disk. In the exemplary embodiment, memory device 322 stores, without limitation, application source code, application object code, configuration data, additional input events, application states, assertion statements, validation results, and/or any other type of data.

Figure 4:
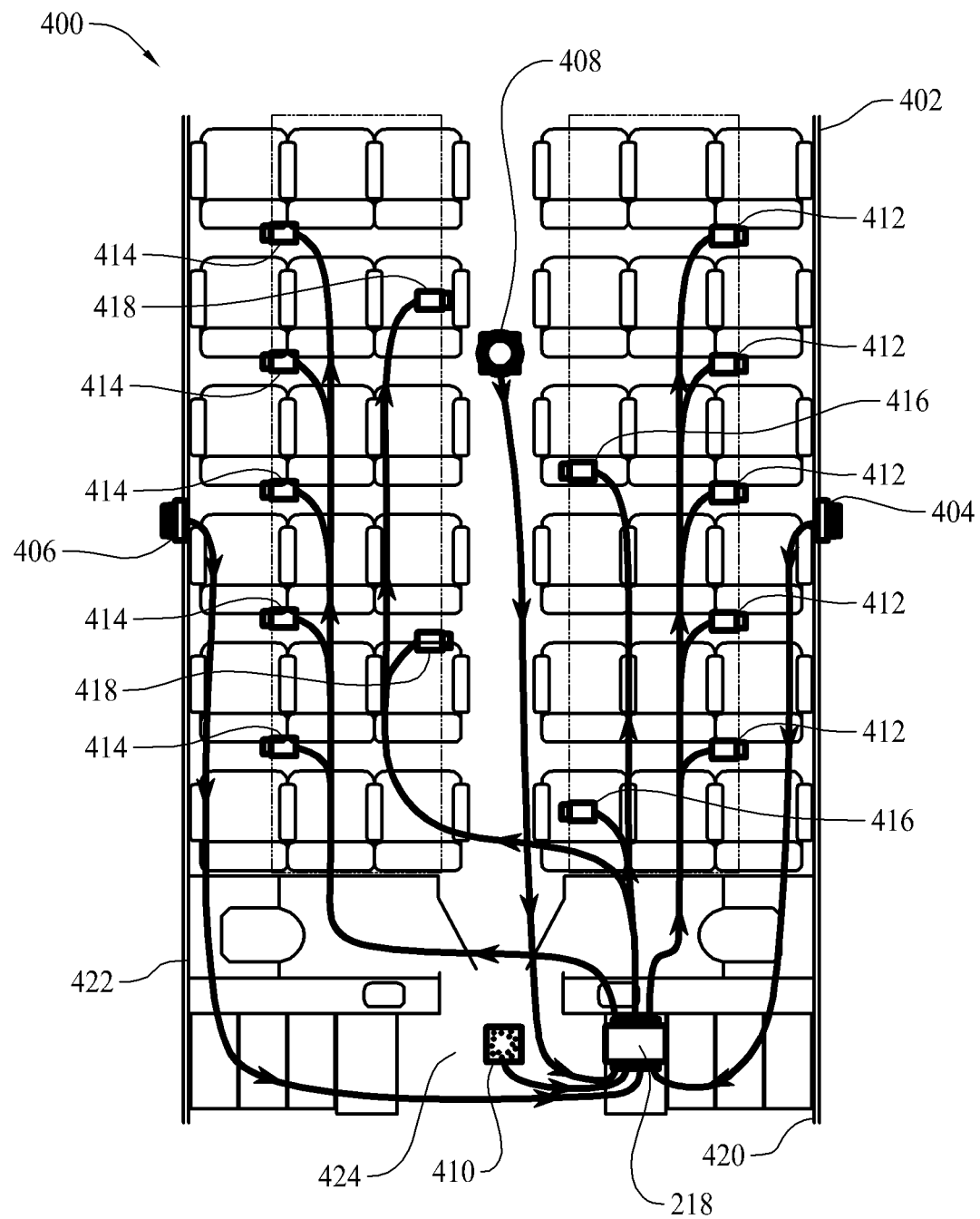
FIG. 4 is an illustration of an exemplary system being used to provide a remote virtual view in an aircraft.

FIG. 4 is an illustration of an alternative system 400 that may be used to provide a remote virtual view and that is installed in an aircraft 402. System 400 is similar to system 200 (shown in FIG. 2) and includes imaging devices 404, 406, 408, and 410, display devices 412, 414, 416, and 418 and distribution device 218.

In the exemplary embodiment, imaging device 404 is mounted to a right external surface of aircraft 402, imaging device 406 is mounted to a left external surface of aircraft 402, imaging device 408 is mounted on a top external surface of aircraft 402, and imaging device 410 is mounted on a bottom external surface of aircraft 402. Thus, imaging device 404 captures images off the right side of aircraft 402, imaging device 406 captures images off the left side of aircraft 402, imaging device 408 captures images above aircraft 402, and imaging device 410 captures images below aircraft 402. Imaging devices 404, 406, 408, and 410 are substantially the same as imaging devices 204 and 206 described above. In other embodiments, imaging devices 404, 406, 408, and/or 410 may be mounted in other locations to capture images of different views. Further, in some embodiments imaging devices 404, 406, 408, and/or 410 may be mounted between the interior and the exterior of aircraft 402, so as not to protrude from an exterior surface of aircraft 402.

Distribution device 218 receives images from imaging devices 404, 406, 408, and/or 410 and selectively transmits the signals to display devices 412, 414, 416, and/or 418 in the manner described above.

In this embodiment, display devices 412, 414, 416, and 418 are projectors. Images received by display devices 412, 414, 416, and 418 are projected onto an interior surface of aircraft 402. More specifically, display devices 412 project images onto a right side 420 interior wall of aircraft 402 and display devices 414 project images onto a left side 422 interior wall of aircraft 402. Moreover, display devices 416 project images onto a ceiling (not shown) of aircraft 402 and display devices 418 project images onto a floor 424 of aircraft 402.

In the exemplary embodiment, images received from each imaging device 404, 406, 408, and 410 are selectively transmitted by distribution device 218 to the display devices 412, 414, 416, and/or 418 to display the images on the part of the aircraft 402 from which the images were acquired. For example, images received from imaging device 404 will be transmitted to display device 412 for display on right side 420 of aircraft 402 and images received from imaging device 406 will be transmitted to display devices 414 for display on the left side 422 of aircraft 402. Similarly, images from imaging device 408 will be transmitted to display devices 416 for display on the ceiling of aircraft 402 and images received from imaging device 410 will be transmitted to display devices 418 for display on floor 424 of aircraft 402. Thus, system 400 may create an appearance of openness within aircraft 402, by displaying images of the skies around aircraft 402 along the walls, ceiling, and floor of aircraft 402. Further, system 400 may replicate windows in aircraft 402, even if aircraft 402 does not include any passenger cabin windows.

In the exemplary embodiment, images received from each imaging device 404, 406, 408, and 410 are split by distribution device 218. Different portions of the split images are selectively sent to different display devices 412, 414, 416, and/or 418. Moreover, distribution device 218 may split images into separate, but overlapping images. Thus, when projected in an overlapping manner by adjacent display devices 412, 414, 416, and/or 418, system 400 may create a generally seamless recreation of the image acquired by imaging devices 404, 406, 408, and/or 410. Additionally, overlapping the images may reduce disturbances in the projected images if one, or part of one, imaging device 404, 406, 408, and/or 410 is obstructed, such as by a passenger, a piece of luggage, a seat, etc.

In the exemplary embodiment, at least one display device 412, 414, 416 and/or 418 is mounted in an overhead luggage compartment of aircraft 402. In other embodiments, display devices 412, 414, 416 and/or 418 are mounted in other locations. For example, display devices 412, 414, 416 and/or 418 may be mounted in a passenger seat, in floor 424, on walls 420 and 422, etc.

Images to be displayed on right side 420, left side 422 and the ceiling of aircraft 402 will generally be displayed on a non-planar surface due to the cylindrical shape of aircraft 402. Accordingly, in the exemplary embodiment, images to be displayed on these non-planar surfaces are altered to reduce an amount of distortion of the projected images that may be caused by the non-planar surfaces. In some embodiments, distribution device 218 alters the images. In other embodiments, display devices 412, 414, and/or 416 alter the images, such as via a corrective lens.

Figure 5:
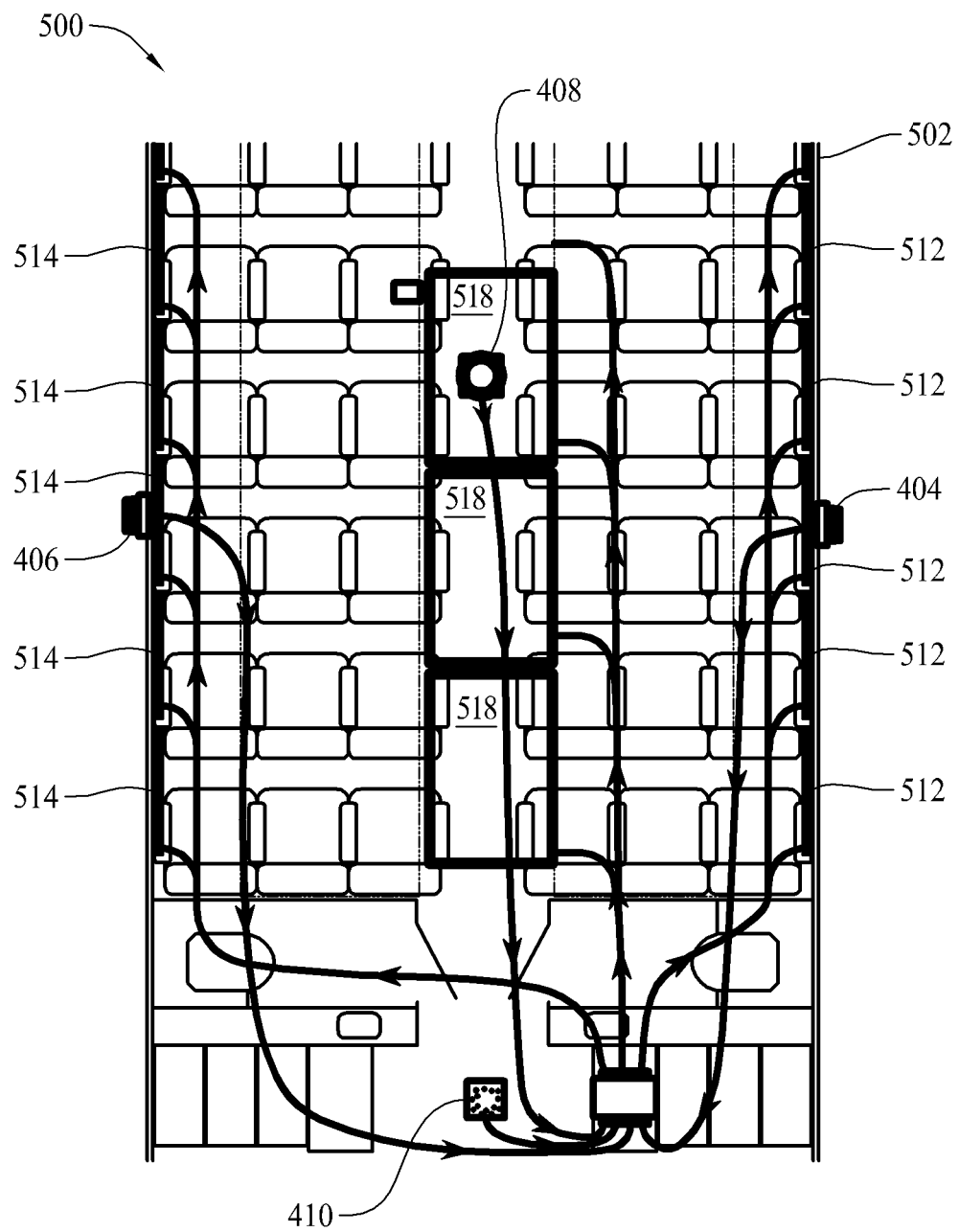
FIG. 5 is an illustration of an alternative system that may be used to provide a remote virtual view in an aircraft.

FIG. 5 is an illustration of another alternative system 500 that may be used to provide a remote virtual view, and that is installed in an aircraft 502. System 500 is similar to systems 200 and 400 (shown in FIGS. 2 and 4) and includes imaging devices 404, 406, 408, and 410, display devices 512, 514, and 518 and distribution device 218.

In this embodiment, display devices 512, 514, and 518 are monitors mounted to the interior surfaces of aircraft 402. Although not illustrated, system 500 also includes display devices mounted on the ceiling of aircraft 502. Display devices 512, 514, and/or 518 may be any suitable monitors for displaying visual images. For example, display devices 512, 514, and/or 518 may be CRT monitors, LCD monitors, LED monitors, OLED monitors, electronic ink monitors, etc. In other embodiments, display devices 512, 514, and/or 518 are not mounted on the interior surface, but are integrally formed in the interior surfaces of aircraft 502.

Figure 6:
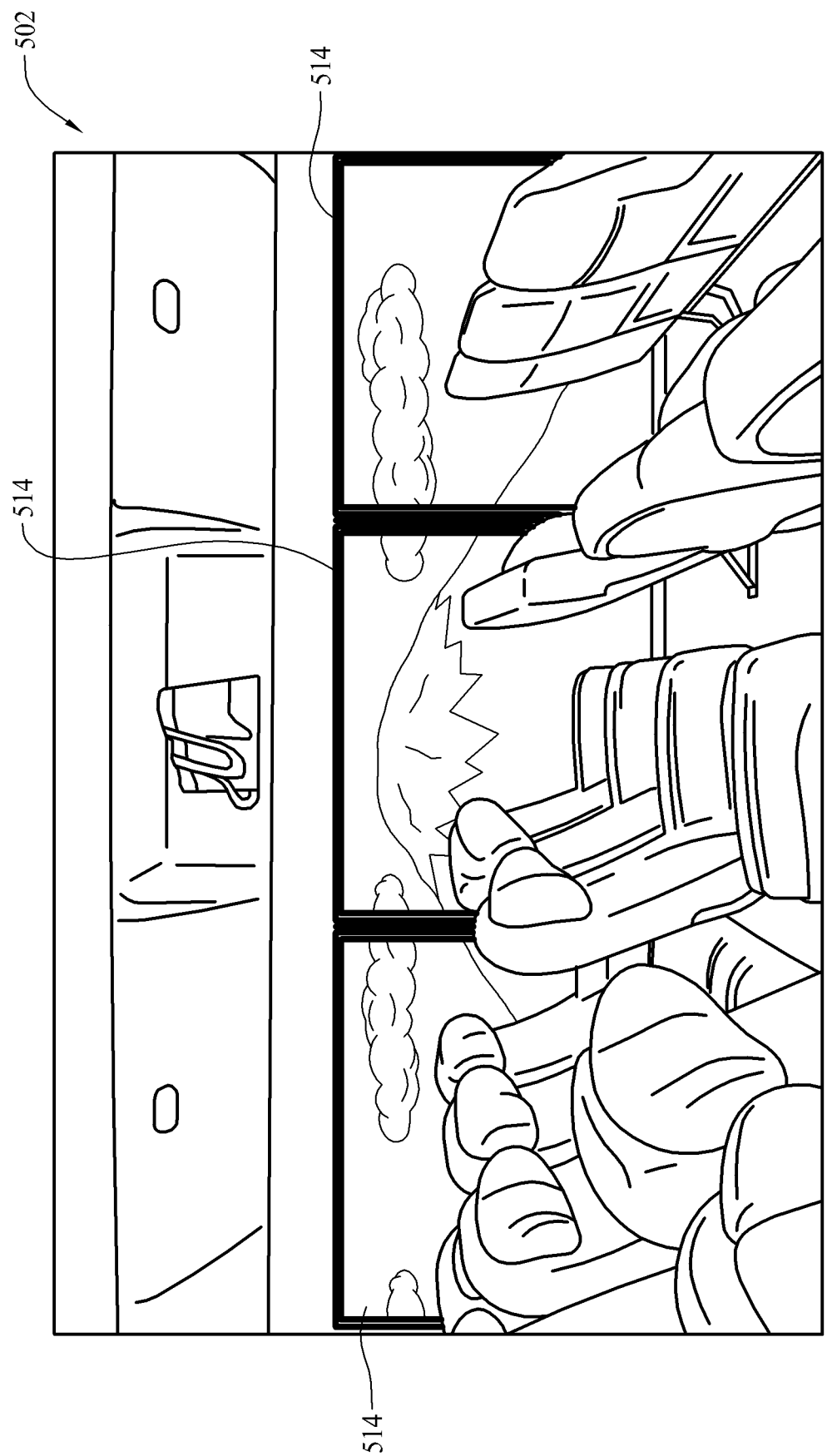
FIG. 6 is an interior view of the side of the aircraft shown in FIG. 6.

FIG. 6 is a side view of a portion of aircraft 502, showing three display devices 514. Each display device 514 is displaying a portion of an image divided by distribution device 218.

Referring back to FIGS. 4 and 5, systems 400 and/or 500, may be used to display images of interest to passengers of aircraft 402 and/or 502. In addition to being able to display images of the area around aircraft 402 and/or 502, systems 400 and/or 500 may be used, for example, to display advertisements to passengers, to display safety messages and demonstrations, to show movies and/or television programs to passengers, and to control the lighting level inside aircraft 402 and/or 502 (for example to simulate dawn, dusk, night, etc.). Moreover, if an item of interest (e.g., the Grand Canyon, New York City, etc.) is within site of aircraft 402 or 502, images of the item of interest may be transmitted to all display devices 412, 414, 416, 418, 512, 514, and 518. Accordingly, all passengers may be able to view the item of interest instead of only those located on a side of aircraft 402 and/or 502 toward the item of interest.

Thus, exemplary embodiments may provide an improved experience for occupants of a structure. Occupants of a structure maybe remotely provided with views of outside the structure. The experience inside the structure may be improved by window-like displays of external scenery. Further, messages, such as safety warnings, may interrupt or overlay the images displayed. An occupant's attention may be commanded away from exterior scenery by simply turning off the display of images or replacing the exterior images with a desired message. Realistic diurnal cycles may be replicated by transmission of live or recorded sunsets and sunrises accompanied by the appropriate modification of ambient lighting in the structure. Furthermore, exemplary embodiments described herein may facilitate reduced costs and/or simplified construction for manufacturers of structures due to a reduced need for windows or other openings between the interior and the exterior of the structure.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for use in providing a remote virtual view to an occupant of an aircraft, said system comprising:
    a plurality of cameras for positioning proximate the aircraft to capture images of scenes of an outside of the aircraft, the aircraft comprising a cylindrical fuselage;
    a plurality of display devices configured to display the captured images on a portion of a non-planar interior surface defined by the cylindrical fuselage of the aircraft such that the displayed captured images provide an appearance of a view of the outside of the aircraft, wherein said plurality of display devices are positioned at different locations along the portion of the interior such that each display device provides different perspectives of the view of the outside of the aircraft when the occupant is at the different locations along the portion of the interior of the aircraft, wherein said plurality of display devices are projectors configured to project images onto the non-planar interior surface, and wherein the portion of the non-planar interior surface is opaque; and
    a distribution device coupled to said plurality of cameras and to said plurality of display devices, said distribution device configured to alter the captured images to reduce distortion for display on the non-planar interior surface, and further configured to selectively transmit the captured images that have been altered to at least one of said plurality of display devices.

2. A system in accordance with claim 1, wherein said distribution device is configured to selectively transmit images other than the captured images to said display device.

3. A system in accordance with claim 1, further comprising a user control module, said user control module communicatively coupled to said distribution device and configured to enable a user to select images for display by said plurality of display devices.

4. A system for use in providing a remote virtual view to an occupant of a structure that includes a non-planar interior surface, said system comprising:
    a remote virtual view system coupled to the structure, the structure comprising an aircraft comprising a cylindrical fuselage that defines the non-planar interior surface, said remote virtual view system comprising:
        a plurality of cameras mounted to the structure, the plurality of cameras positioned to capture exterior images of scenes of an outside of the structure;
        a plurality of display devices configured to display the captured exterior images on a portion of the non-planar interior surface of the structure such that the displayed captured exterior images provide an appearance of a view of the outside of the structure, wherein the plurality of display devices are positioned at different locations along the portion of the interior such that each display device provides different perspectives of the view of the outside of the structure when the occupant is at the different locations along the portion of the interior of the structure, wherein said plurality of display devices are projectors configured to project images onto the non-planar interior surface, wherein the portion of the non-planar interior surface is opaque; and
        a distribution device coupled to the plurality of cameras and the plurality of display devices, the distribution device configured to alter the captured images to reduce distortion for display on the non-planar interior surface, and further configured to selectively transmit the captured exterior images that have been altered to at least one of the plurality of display devices; and
    a controller to control operation of said remote virtual view system.

5. A system in accordance with claim 4, wherein the plurality of projectors are positioned to project overlapping images on the non-planar interior surface.

6. A system in accordance with claim 4, wherein the plurality of projectors are mounted to an overhead bin.

7. A system in accordance with claim 4, wherein the distribution device is configured to selectively transmit images other than the captured images to one or more of the plurality of display devices.

8. A system in accordance with claim 4, wherein said controller comprises a user control module communicatively coupled to the distribution device, the user control module configured to enable a user to select images for display by the display device.

9. A system in accordance with claim 4, wherein the non-planar interior surface of the structure is a windowless surface and the distribution device is configured to selectively replicate a window view for display by at least one of the plurality of display devices.

10. A method of providing a remote virtual view to an occupant of an aircraft, said method comprising:
    capturing, by a plurality of cameras, images of scenes of an outside of the aircraft, the aircraft comprising a cylindrical fuselage;
    receiving, by a distribution device, the captured images from the plurality of cameras;
    altering the captured images to reduce distortion for display on a non-planar interior surface defined by the cylindrical fuselage;
    selectively transmitting, by the distribution device, the captured images that have been altered to a plurality of display devices within the aircraft;
    receiving, by the plurality of display devices, the captured images; and
    displaying, by the plurality of display devices, the captured images on the non-planar interior surface of the aircraft such that the displayed captured images provide an appearance of a view of the outside of the aircraft, wherein the plurality of display devices are positioned at different locations along the portion of the interior such that each display device provides different perspectives of the view of the outside of the aircraft when the occupant is at the different locations along the portion of the interior of the aircraft, wherein said plurality of display devices are projectors configured to project images onto the non-planar interior surface, wherein the portion of the non-planar interior surface is opaque.

11. A system for use in providing a remote virtual view to an occupant of an aircraft, said system comprising:
a plurality of cameras for positioning proximate the aircraft to capture images of scenes of an outside of the aircraft, the aircraft comprising a cylindrical fuselage;
a plurality of display devices configured to display the captured images on a portion of a non-planar interior surface defined by the cylindrical fuselage of the aircraft such that the displayed captured images provide an appearance of a view of the outside of the aircraft, wherein said plurality of display devices are positioned at different locations along the portion of the interior such that each display device provides different perspectives of the view of the outside of the aircraft when the occupant is at the different locations along the portion of the interior of the aircraft;
a distribution device coupled to said plurality of cameras and to said plurality of display devices, said distribution device configured to alter the captured images to reduce distortion for display on the non-planar interior surface, and further configured to selectively transmit the captured images that have been altered to at least one of said plurality of display devices; and
a user control module, said user control module communicatively coupled to said distribution device and configured to enable a user to select images for display by said plurality of display devices.

12. A system in accordance with claim 11, wherein said distribution device is configured to selectively transmit images other than the captured images to said display device.

13. A system in accordance with claim 11, wherein the plurality of display devices comprises a plurality of projectors positioned to project overlapping images on the non-planar interior surface.

14. A system in accordance with claim 13, wherein the plurality of projectors are mounted to an overhead bin.

15. A system in accordance with claim 11, wherein the non-planar interior surface of the structure is a windowless surface and the distribution device is configured to selectively replicate a window view for display by at least one of the plurality of display devices.

16. A system for use in providing a remote virtual view to an occupant of a structure that includes a non-planar interior surface, said system comprising:
a remote virtual view system coupled to the structure, the structure comprising an aircraft comprising a cylindrical fuselage that defines the non-planar interior surface, said remote virtual view system comprising:
a plurality of cameras mounted to the structure, the plurality of cameras positioned to capture exterior images of scenes of an outside of the structure;
a plurality of display devices configured to display the captured exterior images on a portion of the non-planar interior surface of the structure such that the displayed captured exterior images provide an appearance of a view of the outside of the structure, wherein the plurality of display devices are positioned at different locations along the portion of the interior such that each display device provides different perspectives of the view of the outside of the structure when the occupant is at the different locations along the portion of the interior of the structure; and
a distribution device coupled to the plurality of cameras and the plurality of display devices, the distribution device configured to alter the captured images to reduce distortion for display on the non-planar interior surface, and further configured to selectively transmit the captured exterior images that have been altered to at least one of the plurality of display devices; and
a controller to control operation of said remote virtual view system, said controller comprising a user control module communicatively coupled to the distribution device, the user control module configured to enable a user to select images for display by the display device.

17. A system in accordance with claim 16, wherein the plurality of display devices comprises a plurality of projectors positioned to project overlapping images on the non-planar interior surface.

18. A system in accordance with claim 17, wherein the plurality of projectors are mounted to an overhead bin.

19. A system in accordance with claim 16, wherein the distribution device is configured to selectively transmit images other than the captured images to one or more of the plurality of display devices.

20. A system in accordance with claim 16, wherein the non-planar interior surface of the structure is a windowless surface and the distribution device is configured to selectively replicate a window view for display by at least one of the plurality of display devices.

21. A method of providing a remote virtual view to an occupant of an aircraft, said method comprising:
capturing, by a plurality of cameras, images of scenes of an outside of the aircraft, the aircraft comprising a cylindrical fuselage;
receiving, by a distribution device, the captured images from the plurality of cameras;
altering the captured images to reduce distortion for display on a non-planar interior surface defined by the cylindrical fuselage;
receiving, from a user through a user control module communicatively coupled to the distribution device, a selection of images for display;
selectively transmitting, by the distribution device and based on the selection of images for display, the captured images that have been altered to a plurality of display devices within the aircraft;
receiving, by the plurality of display devices, the captured images; and
displaying, by the plurality of display devices, the captured images on the non-planar interior surface of the aircraft such that the displayed captured images provide an appearance of a view of the outside of the aircraft, wherein the plurality of display devices are positioned at different locations along the portion of the interior such that each display device provides different perspectives of the view of the outside of the aircraft when the occupant is at the different locations along the portion of the interior of the aircraft.

22. The method in accordance with claim 21, wherein displaying comprises projecting, by a plurality of projectors, overlapping images on the non-planar interior surface.

23. The method in accordance with claim 21, wherein selectively transmitting comprises transmitting images other than the captured images to one or more of the plurality of display devices.

24. A system in accordance with claim 1, wherein the plurality of projectors are positioned to project overlapping images on the non-planar interior surface.

25. A system in accordance with claim 1, wherein the plurality of projectors are mounted to an overhead bin.

\* \* \* \* \*